United States Patent
Crittin et al.

(10) Patent No.: US 11,282,280 B2
(45) Date of Patent: Mar. 22, 2022

(54) METHOD AND SYSTEM FOR NODE VECTORISATION

(71) Applicant: TIME2MARKET SA, Bellevue (CH)

(72) Inventors: Gérard Philibert Crittin, Port-Valais (CH); Camille Cottagnoud, Sion (CH); Matthieu Claude Léon Garrigues, Saint Denis (FR); Lionel Robert Daniel Crassier, Geneva (CH)

(73) Assignee: TIME2MARKET SA, Bellevue (CH)

( * ) Notice: Subject to any disclaimer, the term of this patent is extended or adjusted under 35 U.S.C. 154(b) by 0 days.

(21) Appl. No.: 16/629,140

(22) PCT Filed: Jul. 8, 2018

(86) PCT No.: PCT/EP2018/068459
§ 371 (c)(1),
(2) Date: Jan. 7, 2020

(87) PCT Pub. No.: WO2019/008185
PCT Pub. Date: Jan. 10, 2019

(65) Prior Publication Data
US 2020/0294315 A1    Sep. 17, 2020

Related U.S. Application Data

(60) Provisional application No. 62/529,623, filed on Jul. 7, 2017.

(51) Int. Cl.
*G06T 19/00* (2011.01)
*G06T 7/33* (2017.01)
*G06T 17/20* (2006.01)

(52) U.S. Cl.
CPC .............. *G06T 19/006* (2013.01); *G06T 7/33* (2017.01); *G06T 17/20* (2013.01); *G06T 2207/10016* (2013.01)

(58) Field of Classification Search
None
See application file for complete search history.

(56) References Cited

U.S. PATENT DOCUMENTS

| | | | |
|---|---|---|---|
| 8,787,700 B1 * | 7/2014 | Aly | G06T 7/73 382/294 |
| 9,948,999 B2 * | 4/2018 | Havekes | H04N 7/181 |
| 10,275,935 B2 * | 4/2019 | Holzer | H04N 5/265 |
| 10,699,421 B1 * | 6/2020 | Cherevatsky | H04N 7/181 |

(Continued)

OTHER PUBLICATIONS

International Search Report for PCT/EP2018/068459, dated Oct. 26, 2018, 4 pages.

(Continued)

*Primary Examiner* — James A Thompson
(74) *Attorney, Agent, or Firm* — Nixon & Vanderhye, P.C.

(57) ABSTRACT

The present invention relates to a method for vectorising nodes within a plurality of 360 degree images. The method includes identifying a set of points of interest within a first 360 degree image of the plurality of 360 degree images; identifying a corresponding set of points of interest within a second 360 degree image of the plurality of 360 degree images; and calculating the 3D coordinates of the points of interest using triangulation of both sets of points of interest. A system and software are also disclosed.

19 Claims, 6 Drawing Sheets

(56) References Cited

U.S. PATENT DOCUMENTS

| | | | |
|---|---|---|---|
| 2004/0027347 A1* | 2/2004 | Farsaie | G06T 17/20 |
| | | | 345/419 |
| 2004/0222987 A1* | 11/2004 | Chang | G06K 9/2036 |
| | | | 345/419 |
| 2005/0128196 A1* | 6/2005 | Popescu | G01S 17/48 |
| | | | 345/420 |
| 2010/0040279 A1 | 2/2010 | Yoon et al. | |
| 2013/0002828 A1 | 1/2013 | Ding et al. | |
| 2014/0243596 A1 | 8/2014 | Yoon et al. | |
| 2018/0139431 A1* | 5/2018 | Simek | H04N 5/2258 |
| 2018/0330188 A1* | 11/2018 | Rakshit | G06T 11/60 |

OTHER PUBLICATIONS

Written Opinion of the ISA for PCT/EP2018/068459, dated Oct. 26, 2018, 6 pages.

* cited by examiner

METHOD AND SYSTEM FOR NODE VECTORISATION

This application is the U.S. national phase of International Application No. PCT/EP2018/068459 filed 8 Jul. 2018, which designated the U.S. and claims the benefit of U.S. Application No. 62/529,623 filed 7 Jul. 2017, the entire contents of each of which are hereby incorporated by reference.

FIELD OF INVENTION

The present invention is in the field of image processing. More particularly, but not exclusively, the present invention relates to processing 360 degree images.

BACKGROUND

360° cameras are a relatively new commodity. 360° cameras can enable an individual to capture a scene along a camera path and display the corresponding 360° video on his mobile, computer or VR headset.

There is a desire for the augmentation of these 360° images or video with nodes to generate 3D meshes or to identify points of interest.

Some augmented reality technologies (such as the Tango platform or Hololens) provide the ability to create nodes during the capture of a physical scene with a 2D camera. These technologies collect distance and/or colours of all points or some points (e.g. corners) of the scene using specific hardware devices that transmit wave signals (usually InfraRed rays) and receive their reflections. From these nodes these technologies create a 3D mesh. Unfortunately, this 3D mesh often has flaws because there are significant limitations for this technology when used outdoors or in strong light.

There are also technologies which combine a set of nodes with photographs of the physical scene. Exemplarily Matterport developed their own proprietary camera with an optical lens and several sensors (InfraRed signals and gyroscope), to enable capture of a succession of (non 360°) pictures, distances and colour measurements by rotating the hardware around the vertical axis of a pod on a single place of a scene. Repeating this operation every metre apart in the scene, Matterport software builds stitched 360° pictures for every place and a corresponding voxel for the whole scene. A user can attach content to the voxels but this depends on the accuracy of the voxels, which, again, is an issue for the sensors when the light is too strong, and impossible to use outdoors. Furthermore, as the images are a metre apart, a blurred morphing between images is added when displaying the scene. The images are stabilized using gyroscope data.

It is an object of the present invention to provide a node vectorisation method and system which overcomes the disadvantages of the prior art, or at least provides a useful alternative.

SUMMARY OF INVENTION

According to a first aspect of the invention there is provided a method for vectorising nodes within a plurality of 360 degree images, including:
  a) identifying a set of points of interest within a first 360 degree image of the plurality of 360 degree images;
  b) identifying a corresponding set of points of interest within a second 360 degree image of the plurality of 360 degree images; and
  c) calculating the 3D coordinates of the points of interest using triangulation of both sets of points of interest.

Other aspects of the invention are described within the claims.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides a node vectorisation method and system for 360 degree images.

The inventors have discovered that successive 360 degree images can be processed to identify points of interest without the use of range data captured by sensors.

Figure 1:
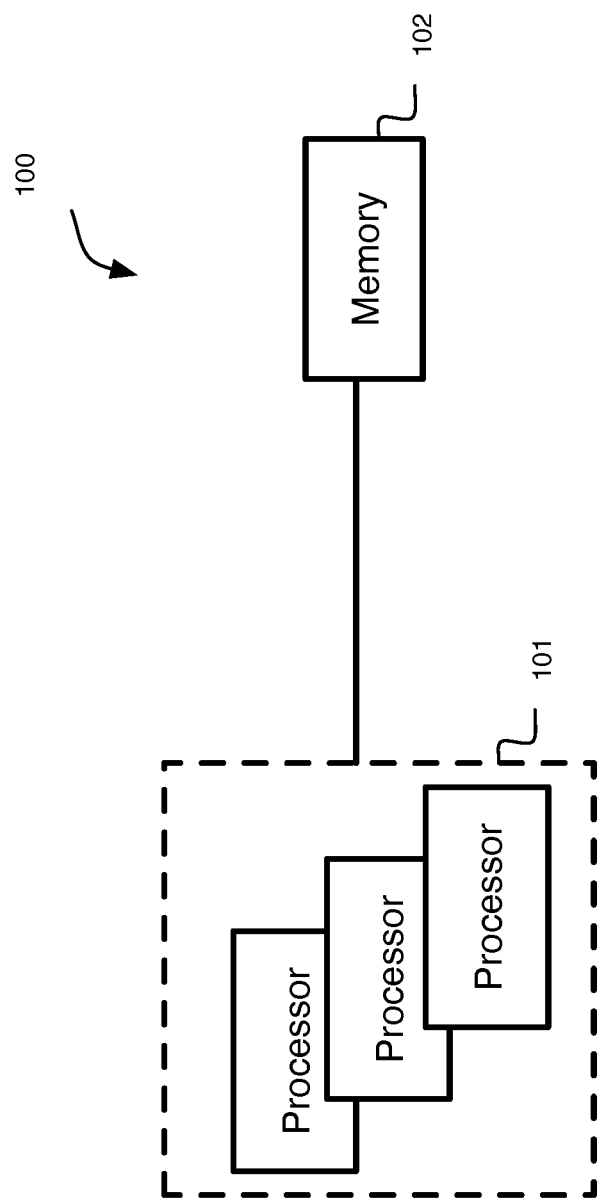
FIG. 1: shows a block diagram illustrating a system in accordance with an embodiment of the invention.

In FIG. 1, a system 100 in accordance with an embodiment of the invention is shown.

One or more processors 101 are shown. The one or more processors 101 are configured to identify a set of points of interest within 360 degree images and to calculate 3D coordinates of the points of interest using triangulation between two or more sets of points of interest. The processor(s) 101 may be configured to use an image processing method to identify the points of interest. The image processing method may utilise one or more visual characteristics to identify the points of interest, for example, the method may detect points which are surrounded by pixels with high local contrast.

One or more memory 102 are shown. The memory 102 are configured to store the plurality of 360 degree images and points of interest.

Figure 2:
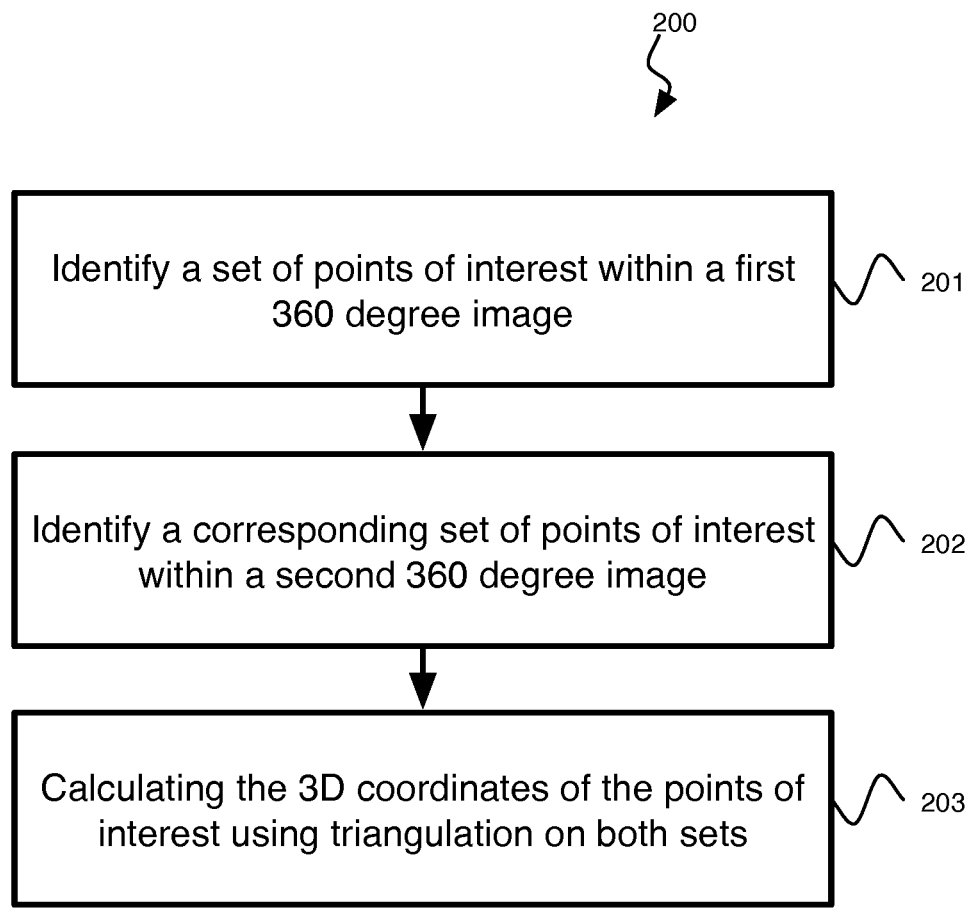
FIG. 2: shows a flow diagram illustrating a method in accordance with an embodiment of the invention.

Referring to FIG. 2, a method 200 for vectorising nodes within a plurality of 360 degree images in accordance with an embodiment of the invention will be described.

The 360 images may be captured from a real-world scene using a 360 degree camera. It will be understood that a 360 degree camera may comprise a series of generally spherically oriented lens and image sensors configured to capture a series of images from a scene which may then be stitched together to generate a 360 degree image of the scene. In an alternative embodiment, the 360 degree camera may comprise a single lens and image sensor configured to capture multiple images in different orientations and stitch the capture images together to form a 360 degree image. In another embodiment, the 360 degree camera may comprise two fish-eye lens which capture two 180 images which are stitched together to form a 360 degree image.

It will be understood that where the terms 360 degree image or 180 degree image are used, the image may not capture the entire 360 or 180 view surrounding the horizontal plane around the camera and may not capture the entire 360 or 180 view surrounding the vertical plane around the camera. For example, in one embodiment, the 360 image may capture a sphere surrounding the camera except for a bottom portion of the sphere.

In step 201, a set of points of interest within a first 360 degree image of the plurality of 360 degree images is identified (e.g. by processor(s) 101).

Each point of interest in the set may be identified using an image processing method in relation to the 360 image. The image processing method may use one or more visual characteristics to identify points of interest. The visual characteristics may relate to a group of pixels proximate to the point of interest. In one embodiment, the image processing method uses high contrast in a group of pixels within the 360 degree image to identify the points of interest (e.g. as described in relation to FIG. 5).

In step 202, a corresponding set of points of interest within a second 360 degree image of the plurality of 360 degree images is identified (e.g. also by processor(s) 100). The first and second 360 degree image may be vertically aligned before identification of the corresponding set of points of interest.

Each of the points of interest in the corresponding set may be identified using their similarity in visual characteristics and 2D coordinates to the points of interest identified from the first 360 degree image.

The 360 degree images may be in a sequence and may be captured from a 360 degree camera moving along a path within a real-world location, such that the 360 degree images are captured at different locations from one another. The relative distances between the 360 degree images or their locations may be calculated and stored in association with each 360 degree image.

Figure 6:
FIG. 6: shows a diagram illustrating triangulation of points of interest to generate nodes in accordance with an embodiment of the invention.

In step 203, 3D coordinates for the points of interest may be calculated (e.g. by processor(s) 101) using triangulation (for example, as described in relation to FIG. 6).

In one embodiment, the points of interest and their associated 3D coordinates may be used to generate a 3D mesh.

Figure 3:
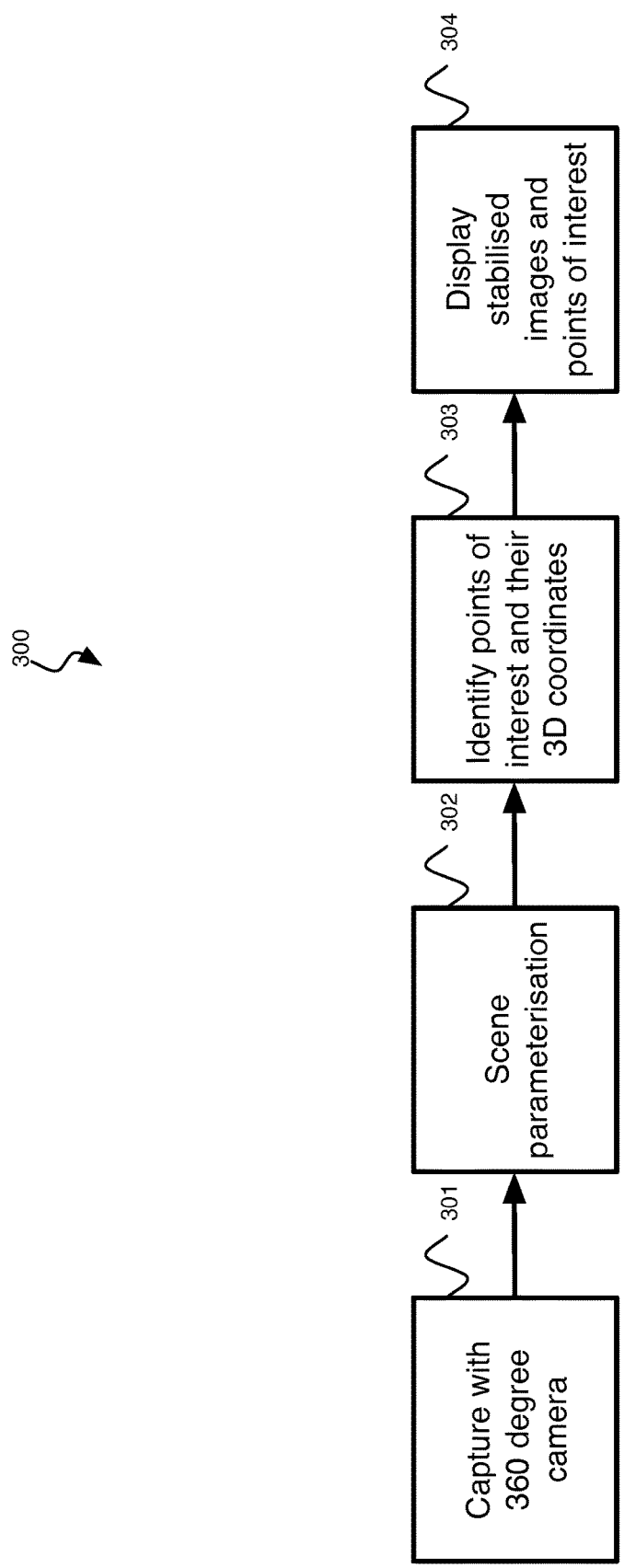
FIG. 3: shows a flow diagram illustrating a method in accordance with an embodiment of the invention.

Referring to FIG. 3, a method 300 for vectorising nodes within a plurality of 360 degree images in accordance with an embodiment of the invention will be described.

In one embodiment of the invention, successive 360° images of a location are analyzed so as to obtain a number of strong points of interest in these images and then both stabilized images and the points of interest may be displayed.

In this embodiment, a camera may be used that has a small parallax between its lenses so as to be able to get well stitched 360° images, ie any area of the real scene at a distance of 70 cm from the camera is always well captured, the pixels of every 360° stitched image being clear and representing the scene accurately.

This embodiment may include the following four steps:
1) Capture with a 360° camera in step 301—low parallax, preferably 4K minimum—using generally the Samsung Gear 360, another 360 degree camera, or a proprietary 360 degree camera;
2) Scene parameterisation in step 302 (verticals determination in the first image, choice of images frequency depending on the pace of the video capture)—may be defined by an internal quality service, can be slipped or automatized;
3) Internal programs executing methods to identify points of interest and determine their 3D coordinates in step 303—described below; and
4) Display stabilized images and the points of interest in step 304, as well as a 3D mesh, for example, in a Unity application.

Methods to Identify Points of Interest and Determine their 3D Coordinates

A vectorisation algorithm is used to define coordinates (X/Y/Z) of a certain number of points of interest in a set of 360° images of a given location/scene.

The algorithm comprises a certain number of steps which start from the first two 360° images:
1) Load two images distant enough such as 8-10 cm—this may be an optimal distance to provide high accuracy (however, images closer than 8 cm may be used in some embodiments)—generally loading one image in three from the 30 frames per second video;
2) Select points of interest in these two images;
3) Set the orientation reference of the camera with the azimut of the first image
4) Fix the distance between the two images to a unit equal to 1—as to set a scale to the set of images
5) Image analysis: Calculate the 2D coordinates of a selected (automatic) number of points of interest in each image, as well as their 3D coordinates in the 3D mesh; pair the 2D coordinates with the 3D coordinates
6) Assess the orientation of the camera of the second image
7) Calculate the 3D coordinates of the points of interest of the two images, using a triangulation algorithm Then start analysing the third image through the same processes:
1) Load the third image
2) Select the points of interest of the third image
3) Pair their 2D coordinates with their 3D coordinates in the 3D mesh
4) Assess the position and the orientation of the camera in the third image
5) Rerun the coordinates pairing algorithm in the third image—more accurate because the position and orientation of the third image are now better known
6) Rerun the assessment of the position and orientation of the camera—to gain in accuracy
7) Calculate the 3D coordinates of the points of interest of 3D mesh, using the triangulation algorithm
8) Check that this third image is not too close from the second one—criteria is the number of points of interest in common between the second and third image. If too close—the algorithm won't keep this third image and will start analysing the fourth one The same process repeats with each image one by one, until the last image of the scene.

Once all images of a scene are entirely analyzed, one algorithm selects the most equidistant images as the images to be displayed—the distance parameter may be provided.

Images are orientated using the verticals defined on the first image.

Images can be orientated either in a fixed direction or in the direction of the camera.

Some images can be created by interpolating two successive images, so as to smooth the display by construction.

Images are then aggregated as a video or a sequence of stabilized relatively equidistant images.

The points of interest may be used to build a 3D mesh. This 3D mesh can be used to give a 3D map of the location and also tied to any other complementary 3D mesh (for example, Google Earth coordinates, or any other coordinates referential).

Further details of the sub processes described above:

Images Vertical Orientation

Matrix and vectorial (Eigen) operations may be used to find the rotation matrix that corrects a non vertical position from the camera operator by using two gradients to find the slope on two axes of the camera operator (using the verticals manually or automatically defined on the first image).

Selection of the Points of Interest

Detector of point—ORB from OpenCV may be used to select the points of interest of the 360 degree image.

A detector may be used that is generally invariant to geometrical transformations and with an affordable calculation time. A number of points may be configured to maximize the precision of SLAM. Good results are obtained between 5000 and 10000 points per image. The ORB detector is used to detect the points of interest of each image and calculates their 2D coordinates. A point of interest may be defined by a batch of pixels by the ORB detector using contrast criteria.

Pairing

The 2D coordinates of a point in the image are paired with its 3D coordinates in the 3D mesh by, for example, for each 2D point detected in the image:
1) Locating the points in the 3D mesh that have the closest ORB descriptor from the 2D point in the five last images;
2) Limiting the search to a distance of 150 pixels; and
3) Parallelisation of the searches on several CPU cores.

Assessment of the Position and Orientation of the Camera

The OpenGV library is used to calculate the position and orientation of each 360° image by:
1) Using the pairing results—2D vs 3D coordinates for each point of interest;
2) Using the OpenGV RANSAC algorithm to limit the impact of pairing errors; and
3) Using the OpenGV PNP non linear optimisation to perform several iterations to find the most accurate position and orientation of each image.

Second Pairing

The 2D coordinates of a point in the image are paired with its 3D coordinates in the 3D mesh with a better precision than for the first pairing by, for example:
1) Using the accurate assessment of the camera positions for the projection of the 3D mesh on the 2D images;
2) Identifying the points in the 3D mesh that have the closest ORB descriptor from the 2D point in the five last images; and
3) Limiting the search to a distance of 20 pixels.

Second Assessment of the Position and Orientation of the Camera

The OpenGV library is used to calculate the position and orientation of each 360° image by:
1) Using the second pairing results—2D vs 3D coordinates for each point of interest;
2) Using the OpenGV RANSAC algorithm to limit the impact of pairing errors; and
3) Using the OpenGV PNP non linear optimisation to perform several iterations to find the most accurate position and orientation of each image.

This iterative process (double pairing and assessment of the camera) may provide for improved accuracy of the position of the points of interest.

Triangulation of the Points of Interest

Library VPP is used to calculate the 3D coordinates of each point of interest by:
1) Using two view points, two positions and two 2D coordinates of each point of interest having a pair with a point of the 3D mesh; and
2) Triangulating each of the points of the 3D mesh having a pair with a 2D point of the current image.

Addition of Points of Interest that have No Correspondence Yet with the 3D Mesh

New points of interest of the current image are added by:
1) Pairing and triangulating the points of interest that are detected in the two last images, but have not been yet triangulated; and
2) Adding a point of interest in the 3D mesh only if the reprojection error is below 10 pixels.

Morphing of Images

New images are added between known images so as to smooth further the display of the sequence of images.

Correcting the Deviation of the Nodes by Recognizing the Same Location in Two Images of a Loop In case a loop is captured (e.g. the camera travelled twice at the exact same location in the same 360° video), applying corrections to all data points along the camera path, including the camera position and the points of interest coordinates, to account for the nullifying of the coordinates differences between the two images of the same location.

Selecting the Key Images

Keeping only the 360° images that are distinct enough to improve the results and reduce calculation time by:
If less of 70% of the points of interest detected in the current image were used to assess the camera position, then the current image is marked as a key image.

Sampling of the Images for Display

After all the vectorization processes, the filmed images are sampled to reduce the camera operator pace variations, so that images are as equidistant as possible by:
1) A distance parameter is given; for ex: 8 cm;
2) From the sample of key images: the first one is selected, then the one whose distance to the first is closer to the given distance parameter, and so on; and
3) From all the filmed images: the first one is selected, then the one whose distance to the first is closer to the given distance parameter, and so on.

Creation of the 3D Mesh

After all the vectorization processes, all points of interest are used to create the 3D mesh of the location.

Figure 4:
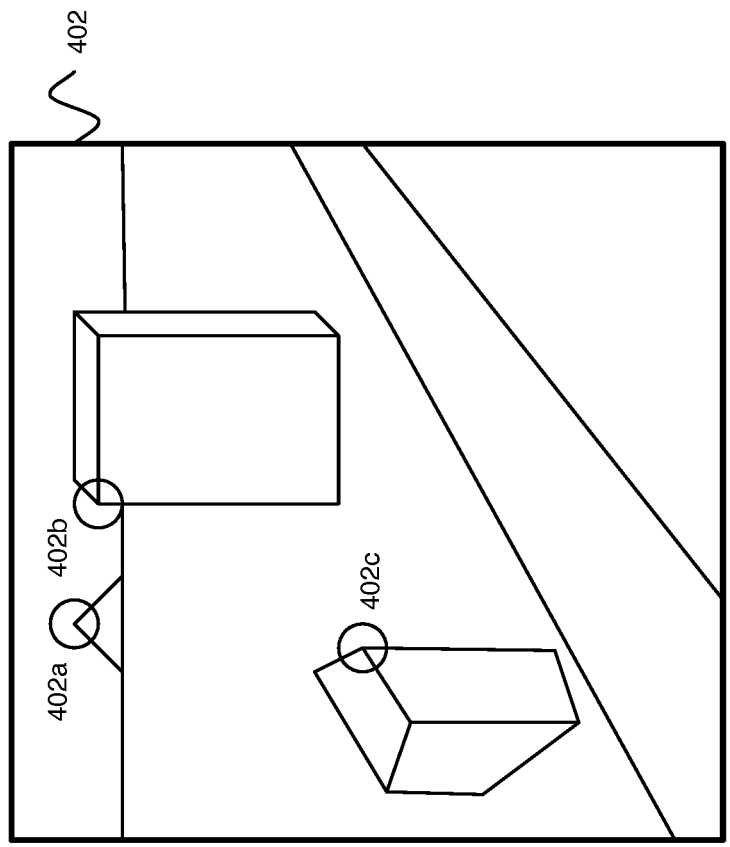
FIG. 4: shows a diagram illustrating point of interest identification within multiple 360 degree images in accordance with an embodiment of the invention.
Figure 4:
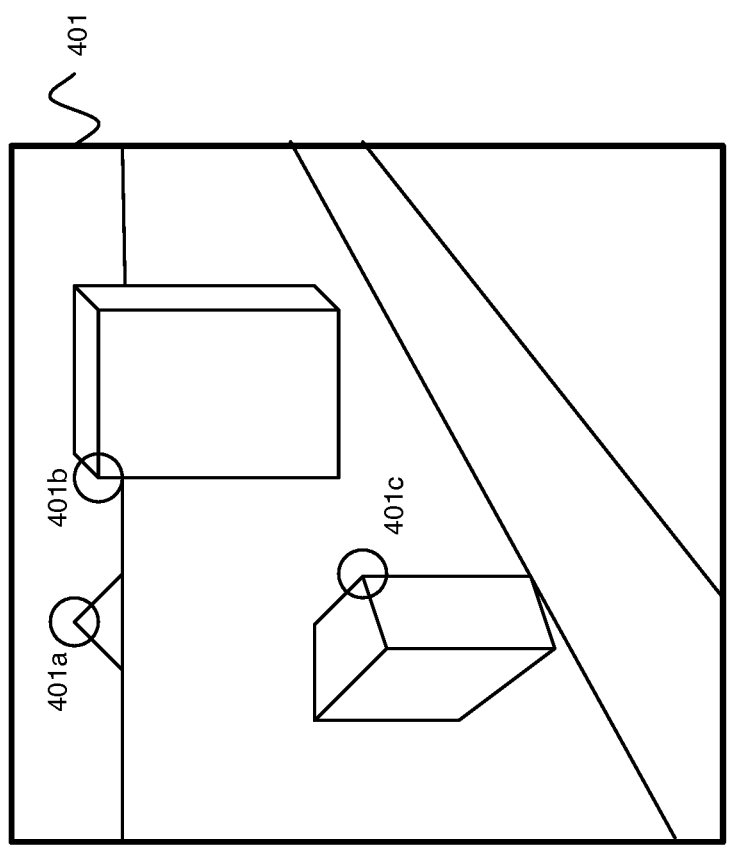

FIG. 4 illustrates identification of a sample of points of interest within two 360 degree images 401 and 402 in accordance with an embodiment of the invention.

It will be appreciated that for illustrative purposes the two 360 degree images do not reflect curvature of straight lines that would be expected in a 360 degree image. Furthermore, only a sample of points of interest identified are shown.

Figure 5:
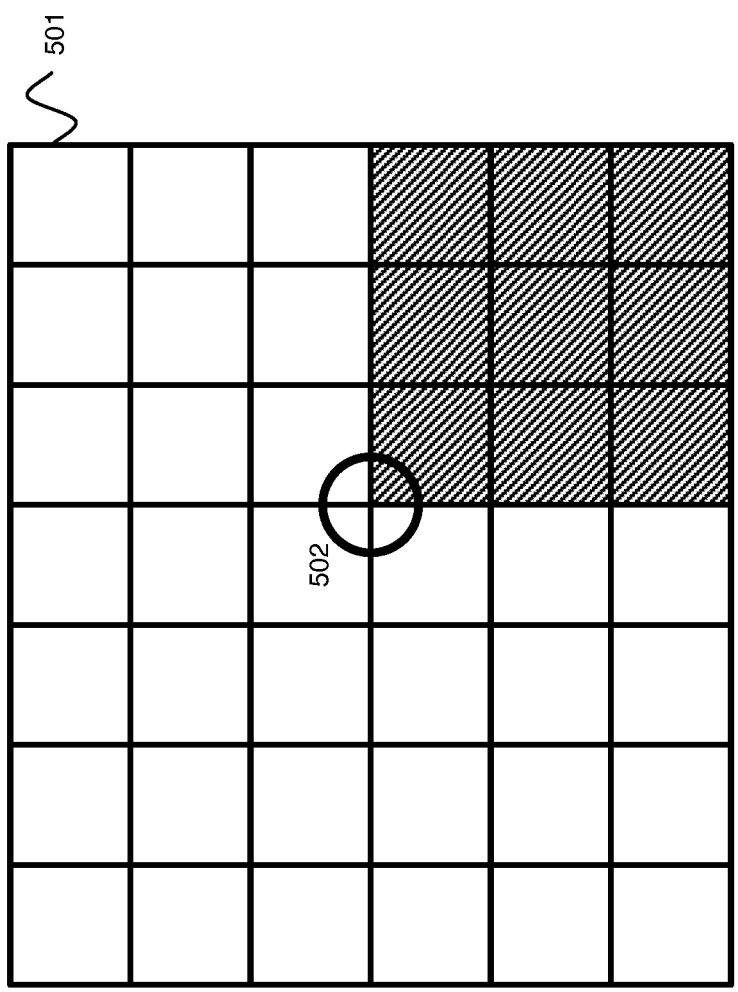
FIG. 5: shows a diagram illustrating potential point of interest identification within a sample of a 360 degree image in accordance with an embodiment of the invention.

In image 401, the following set of points of interest 401a, 401b, and 401c have been identified (for example, using the method of FIG. 5).

In image 402, the following corresponding set of points of interest 402a, 402b and 402c have been identified (for example, using, in part, the method of FIG. 5).

FIG. 5 illustrates determination of a point of interest within a portion 501 of a 360 degree image using a contrast algorithm.

This portion comprises a block of 7 pixels by 6 pixels. A sub-block within the block are a darker shade than the remainder of the block. The point at 502 is identified as the point with high contrast based upon the group of pixels proximate to that point.

FIG. 6 illustrates calculation of the 3D coordinates for the nodes for the points of interest using triangulation.

Each point of interest 601a, 601b, 601c in a set from the first 360 degree image maps to a corresponding point of interest 602a, 602b, 602c in the second 360 degree image. Each mapped point of interest (e.g. 601a and 602a) has a 2D coordinate and, using the distance between the first and second 360 degree images, triangulation may be used to determine the 3D coordinates for the point of interest.

Potential advantages of some embodiments of the present invention are that nodes for points of interest can be added to 360 degree images with cheaper, simpler hardware and quicker capture mode, and that more accurate nodes can be detected and added in a greater variety of environmental conditions.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A method for vectorising nodes within a plurality of sequentially captured 360 degree images captured by a same 360 degree camera, including:

selecting a first 360 degree image and a second 360 degree image from the plurality of sequentially captured 360 degree images, wherein each of the plurality of sequentially captured 360 degree images is associated with a location corresponding to a path along which the 360 degree camera is moved while the plurality of sequentially captured 360 degree images are captured by the same 360 degree camera and the second 360 degree image is selected based upon a location associated with the second 360 degree image differing from a location associated with the first 360 degree image beyond a minimum threshold;

identifying a first set of points of interest within the first 360 degree image of the plurality of sequentially captured 360 degree images, wherein each of the first set of points of interest is identified based on a plurality of pixel values around the point of interest;

identifying a second set of points of interest, corresponding to the first set of points of interest, within the second 360 degree image of the plurality of sequentially captured 360 degree images captured after the first 360 degree image, wherein the second set of points of interest are identified based on similarity in visual characteristics to the first set of points of interest; and calculating 3D coordinates of the points of interest using triangulation of both the first set of points of interest and the second set of points of interest.

2. A method as claimed in claim 1, wherein the first set of points of interest are identified within the first 360 degree image based upon at least one visual characteristic exceeding a threshold.

3. A method as claimed in claim 2, wherein the visual characteristic is contrast.

4. A method as claimed in claim 2, wherein the visual characteristic relates to a group of pixels proximate to each point of interest in the 360 degree image.

5. A method as claimed in claim 1, wherein the second 360 degree image is vertically aligned to the first 360 degree image prior to identification of the second set of points of interest.

6. A method as claimed in claim 1, further including the step of generating features for the first set of points of interest.

7. A method as claimed in claim 6, wherein the second set of points of interest is identified utilizing the features for the first set of points of interest.

8. A method as claimed in claim 1, wherein the plurality of sequentially captured 360 degree images are captured by the degree camera moving along in a real world.

9. A method as claimed in claim 8, wherein each of the images of the sequentially captured 360 degree images is captured at a different position of the 360 degree camera.

10. A method as claimed in claim 8, wherein the 360 degree camera is a video camera.

11. A method as claimed in claim 8, wherein the plurality of sequentially captured 360 degree images differ in distance from one another.

12. A method as claimed in claim 1, wherein each of the plurality of 360 degree images is associated with a different location in a real world.

13. A method as claimed in claim 1, wherein the first and second 360 degree images are separated by one or more images in the plurality of sequentially captured 360 degree images.

14. A method as claimed in claim 1, further including the step of generating a 3D mesh using the 3D coordinates.

15. A method as claimed in claim 1, further including mapping each of the 3D coordinates to an existing 3D mesh of the same real world location.

16. A method as claimed in claim 1, wherein each of the first set of points corresponds to a corner of an object in the first 360 degree image.

17. A method as claimed in claim 1, wherein the first set of points of interest are identified based on a contrast between groups of pixels at the point of interest, determined based on the plurality of pixel values, exceeding a threshold.

18. A system for vectorising nodes within a plurality of sequentially captured 360 degree images captured by a same 360 degree camera, including:

one or more processors configured for:

selecting a first 360 degree image and a second 360 degree image from the plurality of sequentially captured 360 degree images, wherein each of the plurality of sequentially captured 360 degree images is associated with a location corresponding to a path along which the 360 degree camera is moved while the plurality of sequentially captured 360 degree images are captured by the same 360 degree camera and the second 360 degree image is selected based upon a location associated with the second 360 degree image differing from a location associated with the first 360 degree image beyond a minimum threshold;

identifying a first set of points of interest within the first 360 degree image of the plurality of sequentially captured 360 degree images, wherein each of the first set of points of interest is identified based on a plurality of pixel values around the point of interest;

identifying a second set of points of interest, corresponding to the first set of points of interest, within the second 360 degree image of the plurality of sequentially captured 360 degree images captured after the first 360 degree image, wherein the second set of points of interest are identified based on similarity in visual characteristics to the first set of points of interest; and calculating 3D coordinates of the points of interest using triangulation of both the first set of points of interest and the second set of points of interest; and a memory configured for storing a plurality of 360 degree images and 3D coordinates for each of the points of interest.

19. A non-transitory computer readable medium configured for storing a computer program to be executed by a processing system including one or more processors, the computer program, when executed, causing the processing system to:

select a first 360 degree image and a second 360 degree image from a plurality of sequentially captured 360 degree images captured by a same 360 degree camera, wherein each of the plurality of sequentially captured 360 degree images is associated with a location corresponding to a path along which the 360 degree camera is moved while the plurality of sequentially captured 360 degree images are captured by the same 360 degree camera and the second 360 degree image is selected based upon a location associated with the second 360 degree image differing from a location associated with the first 360 degree image beyond a minimum threshold;

identify a first set of points of interest within the first 360 degree image of the plurality of sequentially captured 360 degree images, wherein each of the first set of points of interest is identified based on a plurality of pixel values around the point of interest;

identify a second set of points of interest, corresponding to the first set of points of interest, within the second 360 degree image of the plurality of sequentially captured 360 degree images captured after the first 360 degree image, wherein the second set of points of interest are identified based on similarity in visual characteristics to the first set of points of interest; and calculate 3D coordinates of the points of interest using triangulation of both the first set of points of interest and the second set of points of interest.

\* \* \* \* \*